United States Patent
Huang

(10) Patent No.: US 8,833,385 B2
(45) Date of Patent: Sep. 16, 2014

(54) FAUCET HANDLE

(75) Inventor: Li-Chen Huang, Changhua Hsien (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 433 days.

(21) Appl. No.: 13/184,494

(22) Filed: Jul. 16, 2011

(65) Prior Publication Data

US 2013/0014344 A1    Jan. 17, 2013

(51) Int. Cl.
*F16K 31/60*    (2006.01)
(52) U.S. Cl.
CPC ..................................... *F16K 31/60* (2013.01)
USPC .................................... 137/315.15; 16/110.1
(58) Field of Classification Search
USPC ........ 137/315.15, 801; 251/291, 292; 16/422, 16/110.1; 4/676, 678; 74/558
See application file for complete search history.

(56) References Cited

U.S. PATENT DOCUMENTS

| 7,540,300 | B2 * | 6/2009 | Thomas et al. | 4/678 |
| 8,266,767 | B1 * | 9/2012 | Huang | 16/441 |
| 8,459,145 | B2 * | 6/2013 | Huang | 137/315.15 |
| 8,672,294 | B2 * | 3/2014 | Huang | 137/315.15 |

* cited by examiner

*Primary Examiner* — Kevin Lee
(74) *Attorney, Agent, or Firm* — Che-Yang Chen; Law office of Michael Chen

(57) ABSTRACT

A faucet handle capable of being installed onto a valve rod of a water valve comprises: a control handle and a connecting member. The connecting member is inserted into an engaging slot, covers at least one portion of the valve rod, and has an engaging portion. The engaging portion engages with the engaging edge of the engaging slot. The engaging slot of the control handle includes the detachable connecting member, such that the engaging slot of the control handle can be securely assembled onto different types of water valves, which increase the convenience of the assembly for the control handle.

3 Claims, 6 Drawing Sheets

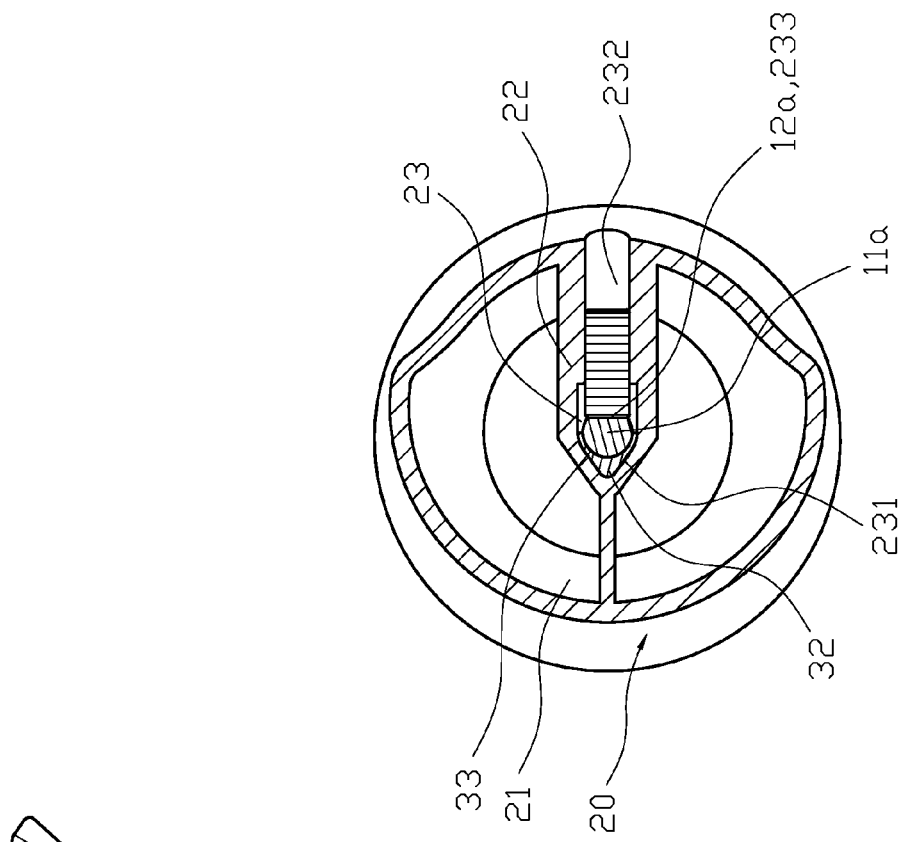
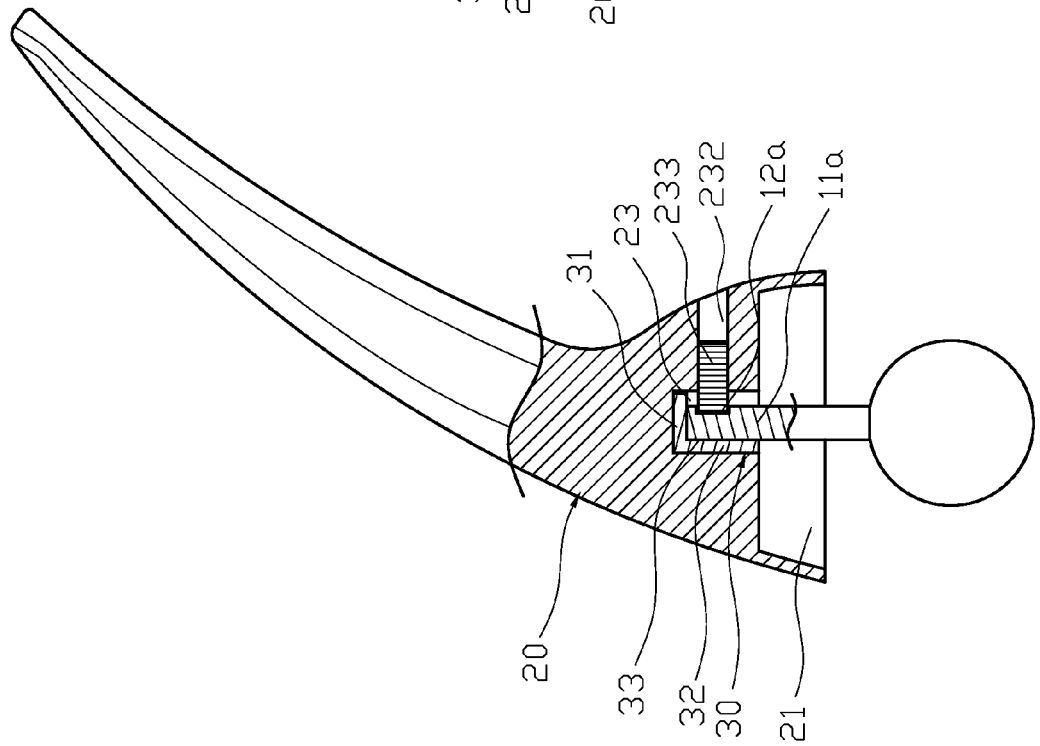
FIG. 4
FIG. 3

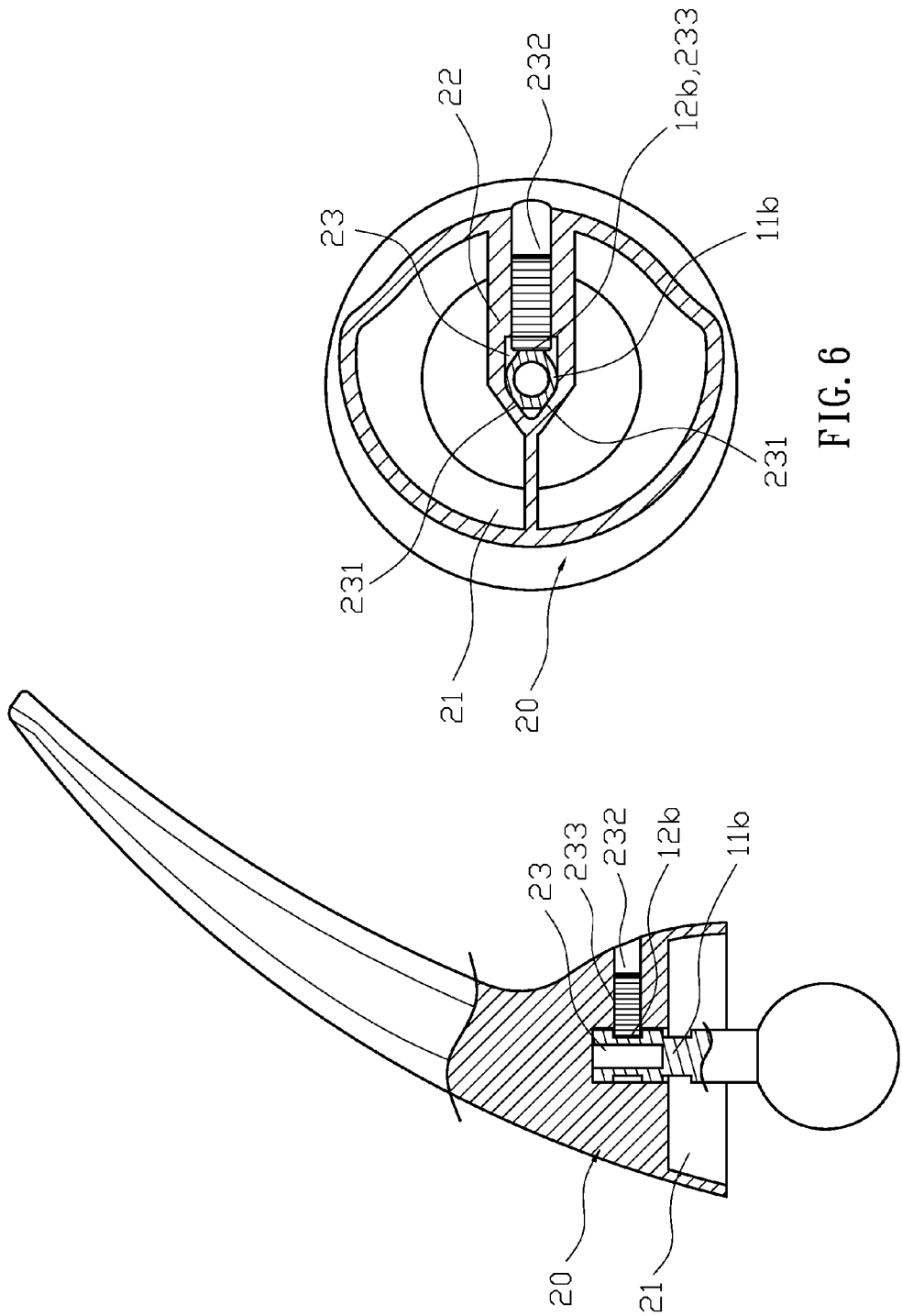

FAUCET HANDLE

BACKGROUND OF THE INVENTION

1. Field of the Invention

The present invention relates to a faucet handle, and more particularly a faucet handle including a detachable connecting member such that faucet handle can be securely assembled onto different water valves.

2. Description of the Related Art

Currently, people prefer faucets with various styles. Moreover, people like to do home improvement by themselves. However, each faucet has a control shaft with various cross-sectional shapes and dimensions, and so the consumer needs to select a matching faucet handle, which can be very inconvenient.

Therefore, it is desirable to provide a faucet handle to mitigate and/or obviate the aforementioned problems.

SUMMARY OF THE INVENTION

An objective of the present invention is to provide a faucet handle.

In order to achieve the above-mentioned objectives, a faucet handle capable of being installed onto a valve rod of a water valve comprises: a control handle having a containment space, the containment space providing an assembling base adjacent to an open end, the assembling base having an engaging slot and an engaging edge on one side, the valve rod having a securing aperture, the securing aperture provided with a securing member, and the securing member pushing against a side of the valve rod. A connecting member is inserted into the engaging slot and has an engaging portion with a cross-sectional shape conformal to the cross-sectional shape of the engaging slot, with the engaging portion engaging with the engaging edge, and a connecting bracket extending from a side of a bottom face of the engaging portion. The connecting bracket further has a curved surface, and the curved surface pushes against a side of the valve rod.

With the above-mentioned structure, the following benefits can be obtained: Since the engaging slot of the control handle includes the detachable connecting member, the engaging slot of the control handle can be securely assembled onto different types of valve rods of the water valve, which increases the convenience for the assembly of the control handle.

Other objects, advantages, and novel features of the invention will become more apparent from the following detailed description when taken in conjunction with the accompanying drawings.

BRIEF DESCRIPTION OF THE DRAWINGS

FIG. 3 is a cross-sectional view of the first embodiment of the present invention.

FIG. 4 is another cross-sectional view of the first embodiment of the present invention.

FIG. 5 is a cross-sectional view of a second embodiment of the present invention.

FIG. 6 is another cross-sectional view of the second embodiment of the present invention.

DETAILED DESCRIPTION OF THE PREFERRED EMBODIMENT

Figure 1:
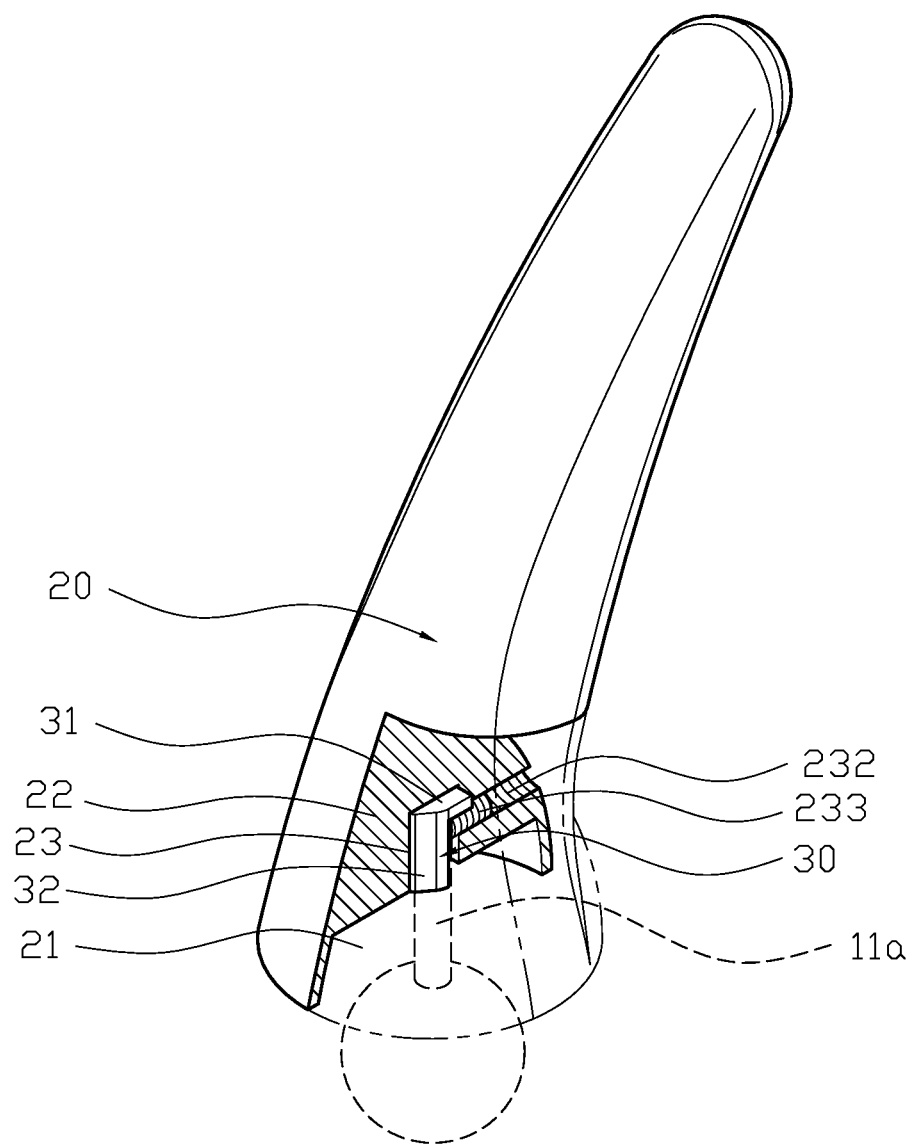
FIG. 1 is a perspective view of a first embodiment of the present invention.
Figure 2:
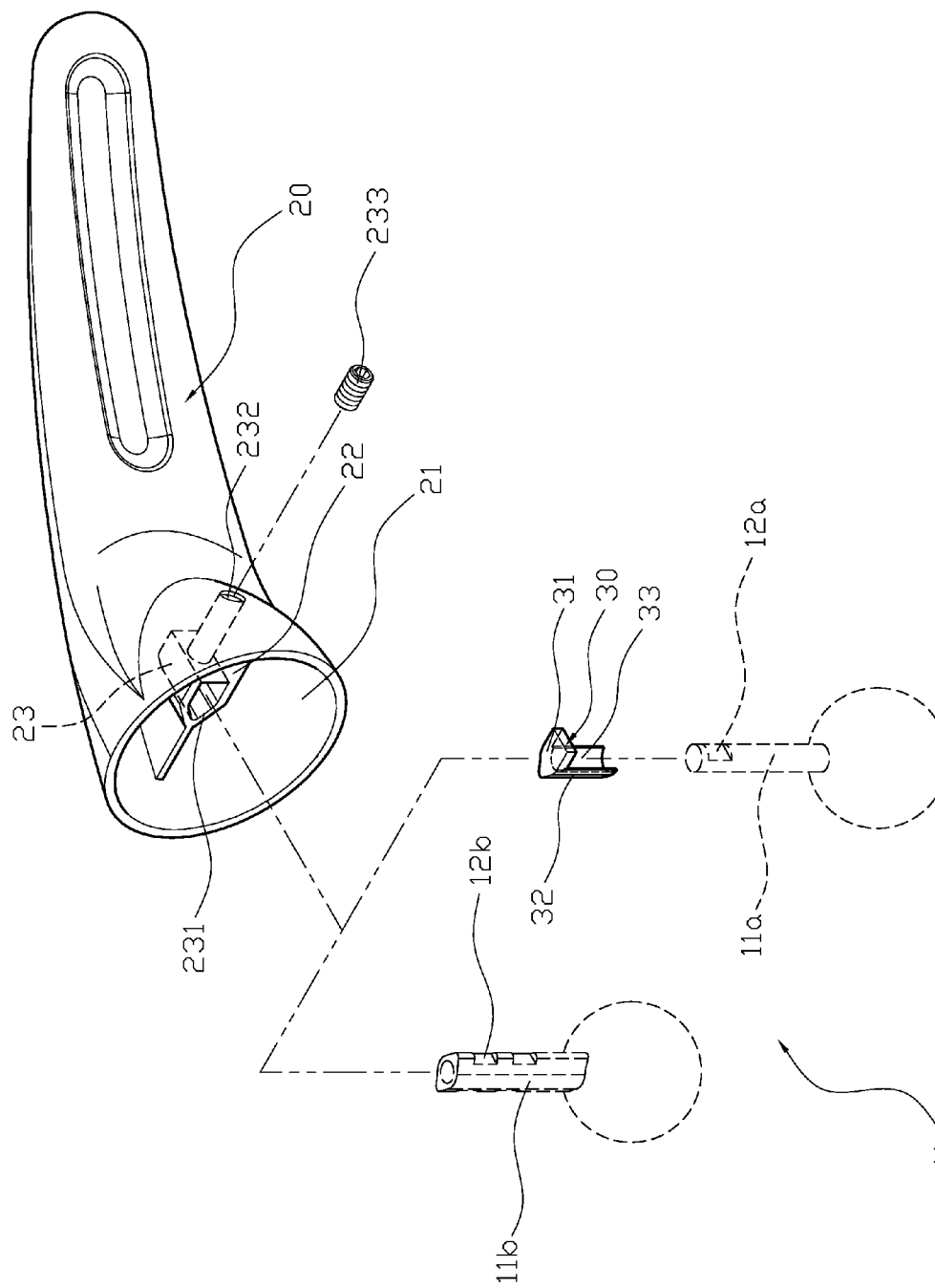
FIG. 2 is an exploded view of the first embodiment of the present invention.
Figure 7:
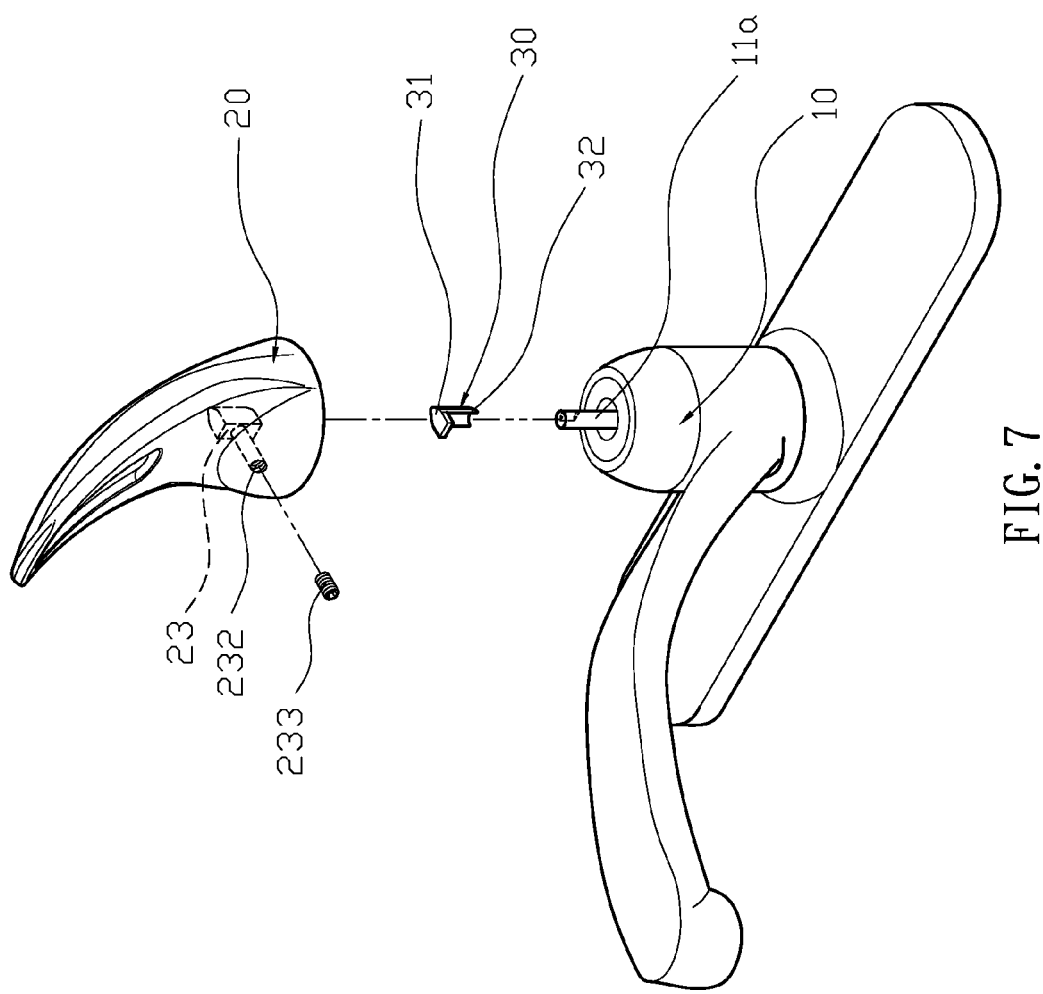
FIG. 7 is a schematic drawing of the embodiment of the present invention installed with a round valve rod.
Figure 8:
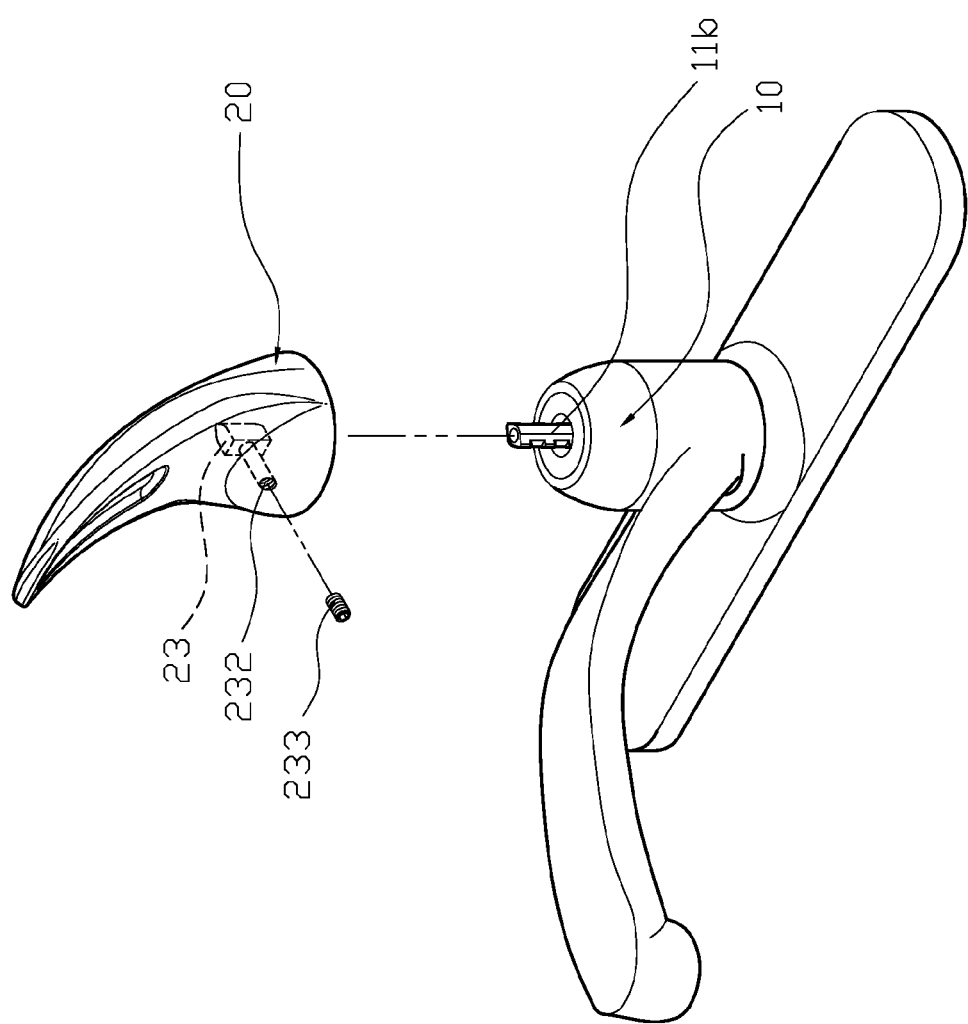
FIG. 8 is a schematic drawing of an embodiment of the present invention being stalled with a rhomboidal valve rod.

Please refer to FIG. 1 and FIG. 2. A faucet handle capable of being installed onto a valve rod 11 of a water valve 10, as shown in FIG. 7 and FIG. 8, comprises: a control handle 20 and a connecting member 30. The control handle 20 has a containment space 21, and the containment space 21 provides an assembling base 22 adjacent to an open end. The assembling base 22 has an engaging slot 23 and a tapered engaging edge 231 on one side. The control handle 20 has a securing aperture 232, the securing aperture 232 is provided with a securing member 233, and the securing member 233 pushes against a side of the valve rod 11. The connecting member 30 is inserted into the engaging slot 23 and has an engaging portion 31 with a cross-sectional shape conformal to the cross-sectional shape of the engaging slot 23. The engaging portion 31 engages with the engaging edge 231; a connecting bracket 32 extends from a side of a bottom face of the engaging portion 31, and the engaging portion 31 and the connecting bracket 32 are perpendicular to each other. Moreover, the connecting bracket 32 further has a curved surface 33, and the curved surface 33 pushes against another side of the valve rod 11.

For actual use, please refer again to FIG. 2. The control handle 20 is capable of being installed onto water valves with various types of valve rods 11a, 11b. The cross-sectional shape of the valve rod 11a is circular, and a slot 12a is disposed on one side of the rod 11a; the cross-section shape of the valve rod 11b is rhomboidal, and a plurality of slots 12b are disposed on one side of the rod 11b.

Please refer to FIG. 2 together with FIG. 3 and FIG. 4. When the user wants to assemble the control handle 20 with the valve rod 11a, the curved surface 33 of the connecting member 30 is first covered over one side the valve rod 11a, and the engaging slot 23 of the assembling base 22 of the control handle 20 is jacketed onto the connecting member 30 so that the engaging edge 231 of the engaging slot 23 and the engaging portion 31 and the connecting member 30 engage with each other. Then, the securing member 233 is screwed into the securing aperture 232 and pushes against the slot 12a of the valve rod 11a to tighten against and secure the valve rod 11a.

Please refer to FIG. 2 together with FIG. 5 and FIG. 6. When the user wants to assemble the control handle 20 to the valve rod 11b, the connecting member 30 is first disassembled from the engaging slot 23 of the control handle 20, and the engaging slot 23 of the assembling base 22 of the control handle 20 is jacketed onto the valve rod 11b of the water valve 10. Then, the securing member 233 is screwed into the securing aperture 232 and pushes against the slot 12b of the valve rod 11b to cause one side of the valve rod 11b to engage with the engaging edge 231 of the engaging slot 23. Since the engaging slot 23 of the control handle 20 includes the detachable connecting member 30, the engaging slot 23 of the control handle 20 can be securely assembled onto different types of valve rods 11a, 11b of the water valve 10.

With the above-mentioned structure, following benefits can be obtained: Since the engaging slot 23 of the control handle 20 includes the detachable connecting member 30, the engaging slot 23 of the control handle 20 can be securely assembled onto different types of valve rods 11a, 11b of the water valve 10, which increase the convenience of the assembly of the control handle 20.

Although the present invention has been explained in relation to its preferred embodiment, it is to be understood that many other possible modifications and variations can be made without departing from the spirit and scope of the invention as hereinafter claimed.

What is claimed is:

1. A faucet handle capable of being installed onto a valve rod of a water valve comprising:
   a control handle having a containment space, the containment space providing an assembling base adjacent to an open end, the assembling base having an engaging slot and an engaging edge on one side, the control handle having a securing aperture, the securing aperture provided with a securing member, and the securing member pushing against a side of a valve rod of a water valve; and
   a connecting member inserted into the engaging slot and having an engaging portion with a cross-sectional shape conformal to the cross-sectional shape of the engaging slot, the engaging portion engaging with the engaging edge, a connecting bracket extending from a side of a bottom face of the engaging portion, the connecting bracket further having a curved surface, and the curved surface pushing against a side of the valve rod of the water valve.

2. The faucet handle as claimed in claim 1, wherein the engaging edge of the engaging slot of the control handle is tapered.

3. The faucet handle as claimed in claim 1, wherein the engaging portion and the connecting bracket are perpendicular to each other.

* * * * *